Oct. 9, 1951   LAMBERTUS-WILLEM SCHMIDT   2,570,493
FRICTION GEARING WITH AN ADJUSTABLE GEARING RATIO
Filed April 4, 1946   2 Sheets-Sheet 1
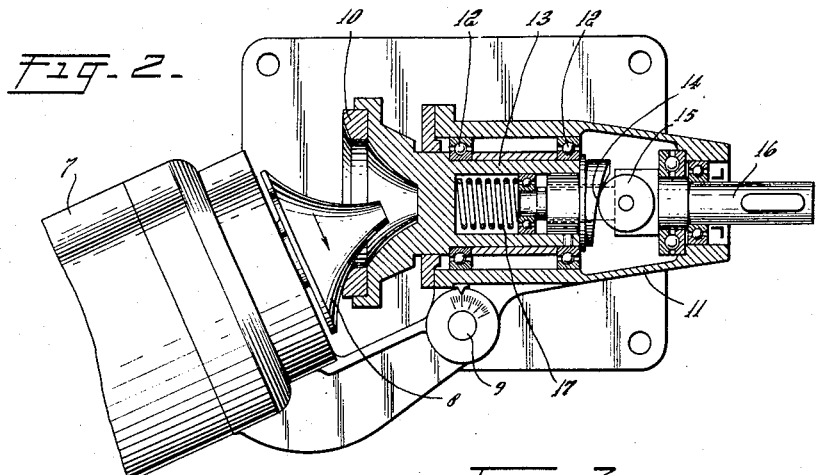
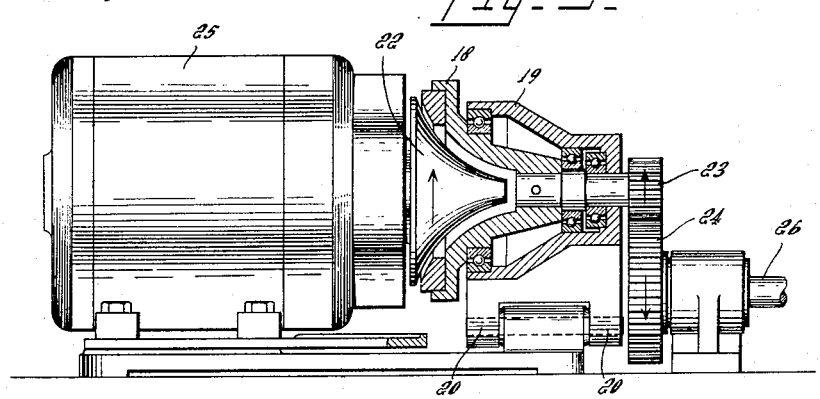
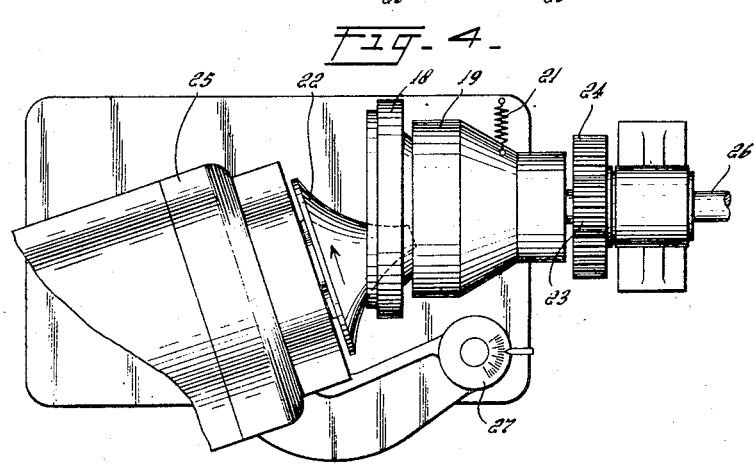
*Inventor*
*Lambertus Willem Schmidt*
By his attorneys
Howson and Howson Oct. 9, 1951 LAMBERTUS-WILLEM SCHMIDT 2,570,493
FRICTION GEARING WITH AN ADJUSTABLE GEARING RATIO
Filed April 4, 1946 2 Sheets-Sheet 2

Inventor
Lambertus Willem Schmidt
By his Attorneys
Howson and Howson

Patented Oct. 9, 1951

2,570,493

UNITED STATES PATENT OFFICE 2,570,493

FRICTION GEARING WITH AN ADJUSTABLE GEARING RATIO

Lambertus-Willem Schmidt, The Hague, Netherlands

Application April 4, 1946, Serial No. 659,609
In the Netherlands January 4, 1946

4 Claims. (Cl. 74—193)

The invention relates to a friction-gearing for an adjustable gearing-ratio with a friction-cone and a friction-ring surrounding same with which one of these parts is coupled with the driving axle whereas the other part is coupled with the driven axle. By mutually adjusting the friction-cone and the friction-ring the gearing-ratio will be altered.

If, with such a friction-gearing a friction-cone and a friction-ring are used, always touching each other according to a straight line, the mutual adjustment of these parts can be reached in a simple way but the drawback will be experienced that a clean evolving of the friction-members over each other will be achieved at the utmost with one definite gearing-ratio, whereas with the greater part of the other gearing-ratio there is a strong deviation in the clean evolving of these members, causing a great heat development, which means loss of energy and strong wear of the friction members, whereas chance of slipping will be increased.

The object of the invention is to provide a friction-gearing with which the clean evolving of the friction members over each other will be closely approximated in every adjustment.

To this end according to the invention the cooperating friction planes of the friction members are correspondingly circle-arc shaped in axial cross section, these members being mutually turnable about an axis which perpendicularly crosses the axes of rotation of the friction planes and which contains the centre of the curve of contact between the friction planes. Therewith the friction-gearing according to the invention may be provided with two pairs of friction planes cooperating in pairs, which pairs being arranged one after another and of which the adjacent friction planes of the one end of the other pair are mutually coupled and are rotatably supported in a holder which is turnable about an axis, which perpendicularly crosses the axes of rotation of all friction planes and which contains the centres of both curves of contact between the friction planes.

Referring to the drawing the invention will now be elucidated by some embodiments.

Fig. 2 is a plan view, partly in horizontal cross section of the first embodiment;

Figs. 3 and 4 are, respectively, a side view partly in section and a plan view of a second embodiment in which the required pressing force between the cooperating friction surfaces is obtained by means of a spring, Fig. 4 also showing the casing adapted to swing about an axis underneath the casing and parallel to the axis of rotation of this friction member;

Figure 1:
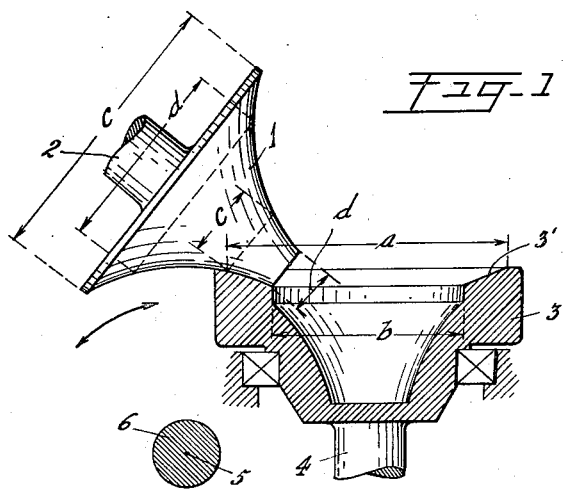
Fig. 1 is a diagrammatic illustration of the principle according to the invention.

As appears from Fig. 1 the friction-gearing according to the invention principally consists of a friction-cone 1 arranged on a driving shaft 2 and of a friction-ring 3 surrounding the cone 1 and mounted on a driven shaft 4. The axial section of the friction-plane of the cone 1 and of the ring 3 consists of a similar circle-arc with a centre 5. This centre 5 coincides with the axis of an axle 6 about which axle the cone 1 and the ring 3 can turn mutually to alter the gearing-ratio. In this way it is obtained that in spite of the large width of the friction plane 3, which is favourable for the transmission of a large power and for keeping low the specific surface pressure, as yet the condition $a:b=c:d$ which applies to clean evolving of the friction planes over each other in each possible mutual position of the friction planes will always be closely approximated.

The principle according to Fig. 1 is applied to the gearing shown in Fig. 2. Therewith a friction-cone 8 is mounted on the rotor-shaft of an electric motor 7. The motor 7 with cone 8 are turnable about an axle 9. The friction-ring 10 which is to be driven is fitted in a bushing 13 which is rotatably arranged in a fixed housing 11, the roller bearings 12 between the bushing and the housing being axially shiftable within the housing 11. At the end of the bushing 13 there are two sloping roller paths 14 supporting two rolls 15 arranged at both sides of the axle 16. The axle 16 is rotatably supported in the housing 11 and in the bushing 13. A spring 17 pushes the friction-ring 10 against the friction-cone 8 by which, during rotation of the cone 8, the ring 10 with its bushing 13 has the tendency to rotate with it. As a result the bushing 13 will be displaced by the cooperation of the roller paths 14 and the rolls 15 by which the ring 10 will be pressed more and more firmly against the cone 8 until the latter finally will drive the ring 10 and the axle 16 without slipping.

For altering the gearing-ratio it will be sufficient to turn the electric motor 7 about the axle of rotation 9 till it reaches the desired position.

With the second embodiment according to Figs. 3 and 4 the friction-ring 18 which is to be driven, is rotatably supported in a housing 19 which is turnable about a horizontal axle 20 located below the housing. A spring 21 pulls the housing 19 by which the friction-ring 18 is kept pressed lightly against the driving friction-cone 22. A pinion 23 is fastened on the friction-ring 18, which pinion cooperates with a tooth-wheel 24 fixed on the driven axle 26. During rotation of the friction-cone 22 by the electric motor 25 the ring 18 under influence of the spring 21 will have the tendency to rotate with it. Therewith the tooth-wheel 24 experiences a counterpressure from the pinion 23 by which the action of the spring 21 is supported and the ring 18 is pressed against the cone 22 still firmer until the cone 22 takes the ring 18 with it without slipping and the axle 26 is thus rotated.

By the rotation of the electric motor about the axle 27 the mutual position of friction-cone and friction-ring and by this the gearing-ratio are altered.

Figure 5:
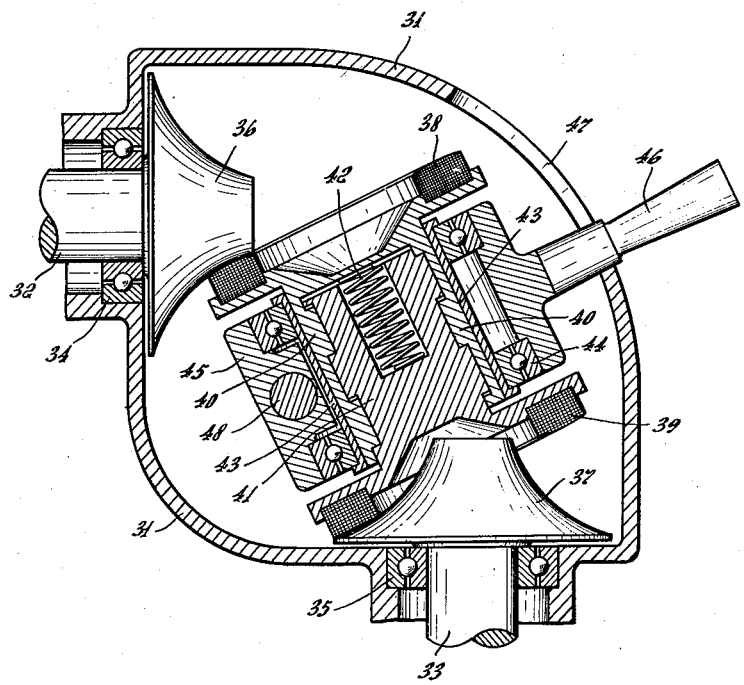
Fig. 5 is a vertical section of the third embodiment.

With the embodiments described when altering the gearing-ratio of the gear, the mutual position of driving and driven axle must be altered. If it is desirable to maintain unaltered the mutual position of driving and driven axle it is preferable to use a construction according to the embodiment shown in Fig. 5. In this embodiment the driving axle 32 and the driven axle 33 are rotatably supported in the housing 31 by means of roller bearings 34 and 35, but in a mutually pre-fixed position.

Within the housing 31 the axles 32, 33 are each provided with a friction cone 36, 37 respectively.

There is a friction ring 38 cooperating with the cone 36 and a friction ring 39 cooperating with the cone 37.

The friction ring 38 is fitted in a holder 40 and the ring 39 in a holder 41. The two holders are coaxial and overlap. The holder 40 is provided internally with a coarse screw thread, coupling with a corresponding screw thread on the outside of the holder 41. In this way the holders have a limited axial component of movement with relation to each other. There is a compression spring 42 fitted in a recess in holder 41 and interposed between the two holders. This spring tends to push the two rings 38, 39 apart and thus keep each friction ring pressed into engagement with its complementary friction cone.

The holder 40 is mounted in a supporting bushing 43 and while the holder can shift longitudinally it cannot rotate with relation to the bushing. However, the bushing is rotatably supported in a holder or casing 45 by means of roller bearings 44. This casing is provided with an adjusting lever 46 reaching through a slot 47 in the housing 31. The casing is turnable or swingable about its axle 48 which is mounted in the side walls of the housing 31. The center line of this axle is directed at angles to the plane which contains the axes of rotation of all the friction members 36, 37, 38, 39. In addition, the center line of the axle also coincides with the centers of the curvatures of the lines of contact between the contacting friction surfaces 36, 38 and 37, 39.

When the friction-gearing is operating the spring 42 pushes both friction-rings 38 and 39 from each other and against the friction-cones 36, resp. 37. The cone 36 which is mounted on the driving axle 32 under influence of the spring 42 will take along the friction-ring 38 with its holder 40, the friction-ring 39 with its holder 41 remaining in rest for the time being. By this the holders 40 and 41 will be screwed out of each other a little causing an increase of the contact-pressure between the cooperating friction-planes. This moving from each other of the holder is continued till the contact-pressures between the friction-planes 36 and 38 on one hand and the planes 37 and 39 on the other hand have increased to such an extent that no slipping will appear any more between the cooperating friction-planes and that during rotation of driving axle 32 driven axle 33 is taken along.

By operating the lever 46 the casing 45 with the parts supported thereby is adjusted about the axle 48 and the gearing-ratio of the gearing is altered.

I claim:

1. A friction gearing with an adjustable gearing radio having two pairs of friction members, each pair comprising a friction cone with a concave friction surface and a friction ring in engagement therewith, the contacting friction surfaces being correspondingly shaped in axial cross-section in the arc of a circle, in combination with a casing in which coaxially coupled holders for the friction rings are rotatably supported, said casing being swingable about an axis, the center line of which is directed at right angles to the plane which contains the axes of rotation of all the friction members, said center line coinciding with the centers of the curvatures of the lines of contact of the contacting friction surfaces, said holders for the friction rings being movable axially with a limited component of movement with relation to each other, and a compression spring interposed between said holders to keep each friction ring pressed into engagement with its complementary friction cone.

2. A friction gearing according to claim 1 in which the intercoupling of the friction ring holders comprises interengaged inclined surfaces fixed to said holders.

3. A friction gearing according to claim 2 in which the inclined surfaces are helical.

4. A friction gearing according to claim 3 in which the inclined surfaces consist of inclined helical surfaces mounted on one of said holders and of cooperating rollers on the other holder.

LAMBERTUS-WILLEM SCHMIDT.

REFERENCES CITED

The following references are of record in the file of this patent:

UNITED STATES PATENTS

| Number | Name | Date |
| --- | --- | --- |
| 457,100 | Yates | Aug. 4, 1891 |
| 1,050,351 | Dean | Jan. 14, 1913 |
| 1,181,218 | Fullerton | May 2, 1916 |
| 1,544,697 | Stoeckicht | July 7, 1925 |
| 2,142,730 | Kohl | Jan. 3, 1939 |

FOREIGN PATENTS

| Number | Country | Date |
| --- | --- | --- |
| 3,304 | Great Britain | May 7, 1903 |
| 211,996 | Switzerland | Jan. 16, 1941 |